United States Patent [19]

Keritsis

[11] Patent Number: 4,848,978
[45] Date of Patent: Jul. 18, 1989

[54] MILLING CUTTER

[75] Inventor: George Keritsis, Knoxville, Tenn.

[73] Assignee: Carboloy Inc., Warren, Mich.

[21] Appl. No.: 86,497

[22] Filed: Aug. 17, 1987

[51] Int. Cl.⁴ .............................................. B26D 1/12
[52] U.S. Cl. ...................................... 407/41; 407/42; 407/49
[58] Field of Search ..................... 407/40, 41, 42, 113, 407/33, 34, 46, 47, 48, 49, 50, 51, 52

[56] References Cited

U.S. PATENT DOCUMENTS

| | | | |
|---|---|---|---|
| 2,903,784 | 9/1959 | Billman | 407/41 |
| 3,116,538 | 1/1964 | Severson | 407/42 |
| 3,205,559 | 9/1965 | Greenleaf | 407/41 |
| 3,831,239 | 8/1974 | Gunsalas | 407/41 |
| 3,902,232 | 9/1975 | Hertle | 407/113 |
| 4,182,587 | 1/1980 | Striegl | 407/113 |

Primary Examiner—Frederick R. Schmidt
Assistant Examiner—Blynn Shideler
Attorney, Agent, or Firm—Hedman, Gibson, Costigan & Hoare

[57] ABSTRACT

A cutting insert assembly including a cutting insert having at least one prismatic face wherein one of said prismatic faces engages a corresponding face of a wedge, wherein the cutting insert has a positive rake angle and excellent heel clearance to obtain the benefits of both positive and negative rake angle cutting inserts.

12 Claims, 2 Drawing Sheets

MILLING CUTTER

FIELD OF THE INVENTION

The present invention is generally directed to circular cutting tools such as a milling cutter having a cutting insert arrangement in which the cutting inserts have a positive radial and axial rake and exceptional heel clearance normally associated with negative rake cutting inserts and which cutting tool employs a unique wedge and locator seat to achieve the desired objects of the invention.

BACKGROUND OF THE INVENTION

A radial rake angle is the angle formed by a reference plane at the face of the cutting insert measured to a plane which originates at the center origin of the body and ends at the sharp corner of the cutting insert. An axial rake angle is the angle formed by the reference plane of the face of the cutting insert measured to a plane parallel to the axis of the cutting body at the cutting point. The reference plane is a plane described by the cutter centerline. In brief, a positive rake angle is achieved when the cutting insert is positioned behind a line passing through the center of the cutter. Conversely, a negative rake angle cutting insert is positioned ahead of the center line of the cutter.

Positive rake angle cutting inserts are desirable because the cutting edge has a shearing effect on the workpiece and are especially desirable for machining high temperature alloys and non-ferrous materials having a high modulus of elasticity (e.g., aluminum). In addition, positive rake inserts exert less force on the workpiece during machining.

In circular or milling cutters, the use of positive rake angle is limited because of the lack of heel clearance. Heel clearance is measured as the angle formed by the top of the cutting insert and a perpendicular line connecting a first plane passing through the center of the tool body and the top rear of the cutting insert and a second plane, parallel to the first plane, which passes through the cutting edge.

Insufficient heel clearance results in interference between the rearward, non-cutting surface of the insert and the workpiece. Due to this problem, cutting inserts are often positioned ahead of the center line of the milling cutter to obtain sufficient heel clearance. This, however, results in a negative rake angle. Negative rake angle cutting inserts exert a pushing action on the workpiece and thereby exert more force on the workpiece and have a tendency to deform the workpiece leading to less precise cuts.

It is therefore an object of the present invention to provide a cutting tool containing at least one cutting insert which has the combination of a positive rake angle and sufficient heel clearance.

It is a further object of the invention to provide a cutting insert with at least one prismatic face having a positive rake angle and sufficient heel clearance for use in a milling cutter.

It is a still further object of the invention to provide a wedge and locator seat used in combination with the cutting insert for positioning and securing the cutting insert of the invention in a milling cutter.

SUMMARY OF THE INVENTION

The present invention is directed to a circular cutting tool including at least one cutting insert assembly wherein the cutting insert is secured in the cutting tool in a manner which enables the cutting insert to have a positive radial rake angle and sufficient heel clearance. As a result of the present invention, the cutting tool exhibits the desirable characteristics of both positive and negative rake cutting inserts.

The cutting insert of the present invention includes at least one prismatic face and, preferably, three prismatic faces. The cutting insert is positioned within the cutting tool so as to have both a positive radial rake angle and sufficient heel clearance and is positioned and secured within a recess of the cutting tool by the interaction of the cutting insert and first and second engaging means.

A prismatic face as used herein is a surface of the cutting insert which bears against a mating surface of the tool body or the first or second engaging means and which provides an independent wedge-like locking force to insure locking integrity of the insert within the recess of the tool body.

Preferably, the cutting insert has a front face, a rear face and at least four side faces. At least two of the side faces are tapered outwardly from the front to the rear face and at least two of the remaining side faces are tapered inwardly. The angle of the outward taper is within the range of about 45 to less than 90 degrees. In a preferred form of the invention, the angle of outward taper is about 60 degrees.

One of the inwardly tapering sides of the cutting insert engages a bearing face of a first engaging means of the cutting insert assembly. One of the outwardly tapering sides engages the top surface of a second engaging means as described in detail hereinafter.

The first engaging means is preferably a wedge which is secured in the recess of the cutting tool by a screw or similar fastening means. The wedge has a bearing face which engages a prismatic side face of the cutting insert. The wedge bearing face is tapered inwardly from the front to the rear of the wedge and away from the cutting insert to provide locking engagement with the corresponding prismatic face of the cutting insert.

The second engaging means is preferably a locator seat which is secured to the recess in the same or similar manner as the wedge (i.e., by a screw or other fastening means). The locator seat has a top surface which is tapered to substantially conform to the taper of the bottom side face of the cutting insert. The bottom side face of the cutting insert may be a prismatic face. The top surface of the locator seat therefore provides a platform for positioning and securing the cutting insert thereon.

The side face of the cutting insert remote from the wedge engaging face which may also be a prismatic face engages a tapered wall of the recess to provide additional support for the cutting insert. In a preferred form of the invention, the wedge engaging face of the cutting insert is tapered inwardly at an included angle greater than the angle of taper of the outwardly tapered faces of the cutting insert. In addition, the faces of the cutting insert which bear on the locator seat and recess may be tapered at different angles with respect to each other to thereby provide additional locking force on the cutting insert.

BRIEF DESCRIPTION OF THE DRAWINGS

The following drawings in which like reference characters indicate like parts are illustrative of embodiments

DETAILED DESCRIPTION OF THE INVENTION

Figure 1:
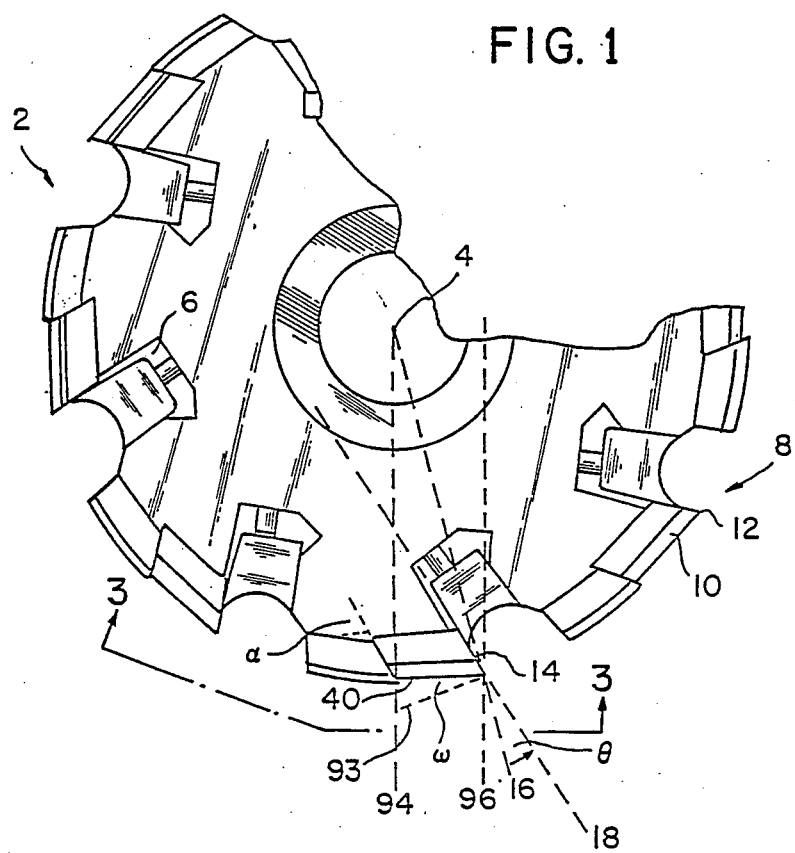
FIG. 1 is a partial perspective view of a milling cutting containing the cutting insert assemblies of the invention.
Figure 2:
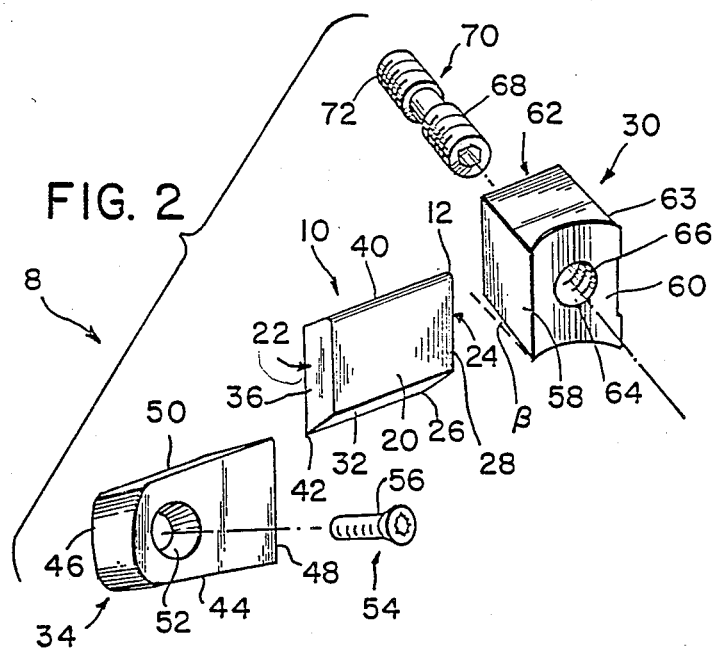
FIG. 2 is an exploded view of a cutting insert assembly of the invention.

Referring to the drawings and particularly to FIGS. 1 and 2, a circular cutting tool 2 having center point 4 includes a plurality of cutting insert assemblies 8 secured in a recess 6. The cutting insert 10 of the cutting insert assembly 8 includes at least one cutting edge 12 formed by a cutting edge face 14. As shown in FIG. 1, a plane 16 passing through the center point 4 and the cutting edge 12 defines a neutral or 0° rake angle. A positive rake angle $\theta$ is shown by the angle formed by a plane 18 passing through the cutting edge face 14 and the plane 16.

Referring to FIG. 2, the cutting insert 10 includes a front face 20 and a rear face 22 and at least four sides faces. One prismatic side face 24 having a bottom edge 26 and a top edge 28 is tapered inwardly from the front face 20 to the rear face 22 and is adapted to bear against a wedge 30 of the cutting insert assembly 8. Another prismatic side face 32 is adapted to engage a locator seat 34. Still another prismatic side face 36 is adapted to engage a wall 88 forming part of the recess 6 in the cutting tool 2 and may be angled by no more or less than one degree with respect to the recess wall 38. Sides faces 32 and 36 taper outwardly from the front face 20 to the rear face 22 of the cutting insert 10. Each of the aforementioned prismatic faces 24, 32 and 36 bear against a mating surface of the tool to provide support and locking engagement of the cutting insert 10 therein.

The included angle of taper $\alpha$ (See FIG. 1) of the prismatic side faces 24, 32 and 36 is preferably from about 45 to less than 90 degrees and most preferably in the area of about 60 degrees. In a preferred form of the invention, the wedge bearing side face 24 has an inward taper with a slightly greater included angel than the side faces 32 and 36 (e.g., on the order of 2 to 6 degrees, preferably about 4 degrees) to provide even greater locking engagement of the cutting insert 10 in the cutting tool 2.

The cutting insert 10 shown in FIG. 2 has another side face 40 of identical inverted dimensions to the side face 36. Because of the semi-symmetrical design of the cutting insert 10, there may be provided an additional cutting edge 42 which may be inserted into the cutting position by rotating the cutting insert 10.

The locator seat 34 includes a bottom surface 44 and a side surface 46 each of which is in contact with the recess 6 of the cutting tool 2. An opposed side surface 48 faces the wedge 30. The locator seat 34 also has a top surface 50 which is tapered upwardly from the side surface 46 to the opposed side 48 to provide a ramp of substantially complimentary shape to the side face 32 of the cutting insert 10. In a preferred form of the invention, the taper of the top surface 50 of the locator seat 34 is slightly less or more than (e.g., about 1°, preferably less than about 0.5) the taper of the side face 32 of the cutting insert 10 to provide an additional locking orientation of the cutting insert 10 within the cutting insert assembly 8.

The locator seat 34 is secured within the recess 6. In one embodiment, the locator seat 34 is provided with a tapered hole 52 for receiving a screw 54 having a corresponding tapered neck 56 for securing the locator seat 34 within a hole 51 in the recess 6 of the cutting tool 2 (see FIG. 5).

The wedge 30 includes a cutting insert engaging face 58 which extends from a front face 60 to a rear face 62. The cutting insert engaging face 58 is tapered inwardly from the front face 60 to the rear face 62 at a side angle $\beta$ of taper from about 5 to about 20 degrees, preferably from about 7 to 10 degrees. In addition, the wedge includes a side face 63 which bears against the recess 6.

The wedge 30 has therethrough a hole 64 having therein grooves 66 which are matable with threads 68 of a screw 70 so that the wedge 30 is movable against the face 24 of the cutting insert 10 to obtain locking engagement therebetween. The screw 70 is provided with a second set of threads 72 for insertion into a groove containing hole 74 within the cutting tool 2 to secure the wedge 30 therein as shown in FIG. 5.

Figure 3:
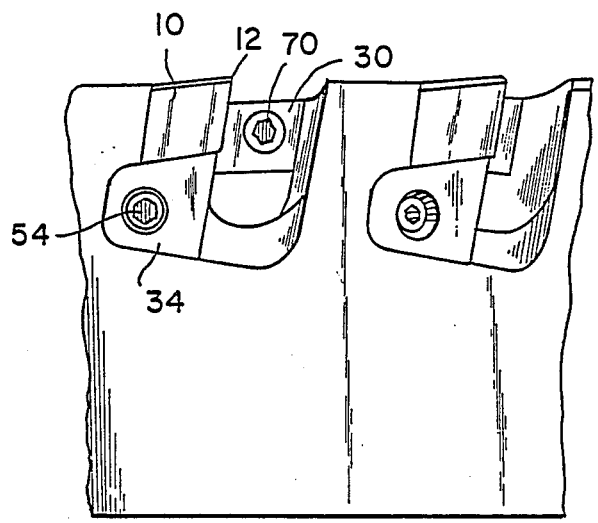
FIG. 3 is a side view of the milling cutter taken along line 3—3 of FIG. 1.
Figure 4:
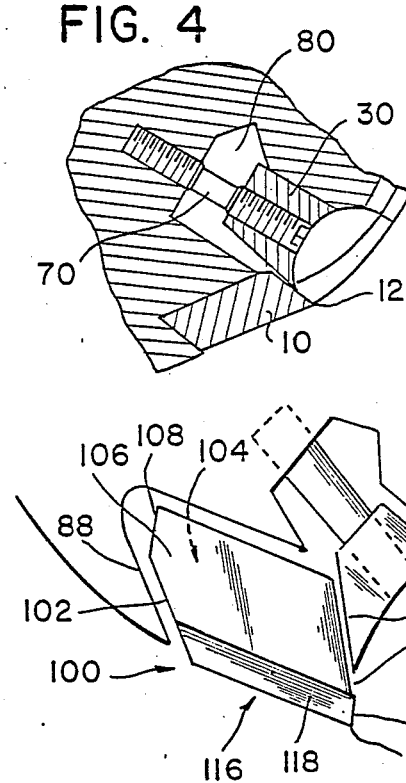
FIG. 4 is a cross-sectional view of the cutting insert assembly of the present invention within a cutting tool.
Figure 5:
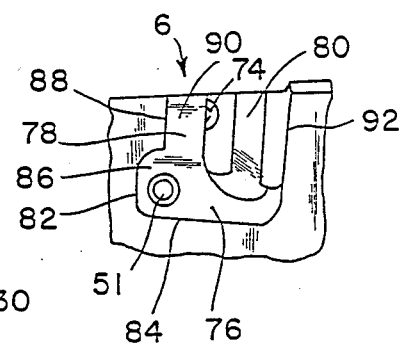
FIG. 5 is a front view of the recess within the cutting tool for housing the cutting insert assembly of the invention.

Referring to FIGS. 3, 4 and 5, the recess 6 of the cutting tool 2 is provided with a pocket 76 for securing the locator seat 34 therein, a pocket 78 for securing the cutting insert 10 therein and a pocket 80 for securing the wedge 30 therein.

The pocket 76 for securing the locator seat 34 includes a side wall 82, a bottom wall 84 and a far wall 86 in which is the hole 51. The locator seat 34 is secured within the pocket 76 by the pressure engagement of the bottom surface 44 of the locator seat 34 against bottom wall 84 and the side surface 46 against the side wall 82 when the screw 54 is inserted into the tapered hole 52 and secured in the hole 51 of the pocket 76.

The pocket 78 for securing the cutting insert 10 has a side wall 88 and a far wall 90 which is in pressure contact with the side surface 36 and the rear face 22, respectively of the cutting insert 10. Additional support for the cutting insert is provided by the pressure engagement of the side face 32 against the surface 50 of the locator seat 34 and the side face 24 against the face 58 of the wedge 30.

The pocket 80 for the wedge 30 includes a side wall 92 providing locking engagement with the side face 63 of the wedge 30 when the cutting insert 10 is in the operable position for cutting a workpiece.

Figure 6:
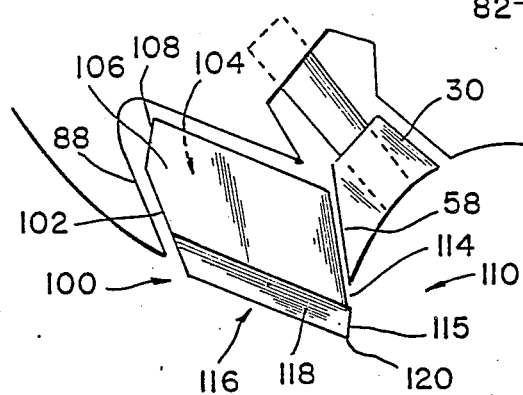
FIG. 6 is a perspective view of another embodiment of the cutting insert assembly of the invention.

The cutting insert of the present invention may be provided with secondary tapered faces as shown in FIG. 6. Specifically, the cutting insert 100 has a side face 102 which tapers outwardly from the front face 104 only partially toward rear face 106 wherein a secondary side tapered face 108 begins and terminates at the rear face 106. The angle of taper of face 102 is greater than the angle of taper of the secondary face 108.

In addition, another side face 110 may comprise a first inwardly tapered face 114 which bears directly against the face 58 of the wedge 30 and a secondary tapered face 115. Wedge bearing face 114 and side face 102 are tapered at different angles (i.e., not parallel) in order to generate a greater locking force within the recess 6. Still further, the top face 116 of the cutting insert 100 may have a partially tapered face 118 to provide a cutting edge 120 particularly suited for smooth cut finishes. If the face 118 is not tapered, the cutting edge 120 will provide an initial or rough cut finish. A similar partially tapered face may be provided in the embodiment shown in FIG. 2 for the same purpose.

Other geometries consistent with the cutting inserts described herein are within the scope of the present invention.

In operation, the cutting insert assembly 8 is secured in the recess 6 of the cutting tool 2 by first securing the locator seat 34 in the corresponding pocket 76. This may be accomplished, for example, by aligning the hole 52 with the corresponding hole 51 in the recess 6 and driving the screw 54 therein until the tapered neck 56 bears against the wall of the hole 52. The cutting insert 10 is then inserted by placing the side face 32 on the top surface 50 of the locator seat 34 so that the side face 36 of the insert 10 is flush against wall 88 of the pocket 78.

The cutting insert assembly 8 is then rendered operational by inserting wedge 30 on the wedge screw 70 and rotating the screw 70 until the wedge 30 is in the desired supporting position with the cutting insert engaging face 58 against the wedge contact face 24 of the cutting insert 10. The screw 70 is then secured in the hole 74 of the pocket 80.

As a result, the cutting insert 10 is positioned on the cutting tool 2 in such a manner that the cutting planes 16 and 18 define a positive rake angle. In addition, the cutting insert 10 has a heel clearance angle $\omega$ (see FIG. 1) defined by the angle formed by a line 93 perpendicular to plane 16. The clearane angle $\omega$ is sufficient to prevent interference between the front face 20 of the cutting insert 10 and the workpiece being machined.

I claim:

1. A circular cutting tool having a recess and a cutting insert assembly secured therein, said cutting insert assembly comprising:
    (a) a cutting insert comprising at least one cutting edge, a front face, a rear face, and at least four side faces wherein at least two of said side faces are tapered inwardly from the front to the rear face having one of said inwardly tapered side faces adapted to engage a wedge means and at least two of said side faces are tapered outwardly from the front to the rear face;
    (b) said wedge means comprising a front face, a rear face, and a side face that tapers inwardly from the front face to the rear face and is adapted to engage said engaging side face of the cutting insert and having and included angle which differs form the included angle of said side face such that the side face of the wedge means is adapted to wedgingly engage said cutting insert inwardly tapered engaging side face over less than the entire surface of the cutting insert engaging side face.
    (c) means for wedgingly engaging another of the side faces of the cutting insert, wherein the cutting insert has a positive rake angle with respect to the centerline of the cutting tool.

2. The circular cutting tool of claim 1, wherein the cutting insert has three prismatic faces.

3. The cutting tool of claim 1, wherein the included angle of outward taper is from 45 to less than 90 degrees.

4. The cutting tool of claim 3, wherein the included angle of outward taper is about 60 degrees.

5. The cutting tool of claim 1, wherein said first engaging means is a wedge having a cutting insert engaging face, one of said inwardly tapered side faces of the cutting insert being adapted to engage the cutting insert engaging face of the wedge, said inwardly tapered face of the cutting insert being tapered at an included angle greater than the included angle of the outwardly tapered faces of the cutting insert.

6. The cutting tool of claim 5, wherein the wedge engaging face of the cutting insert has an included angle of taper of about 2 to 6 degrees greater than the outwardly tapered faces of the cutting insert.

7. The cutting tool of claim 6, wherein said wedge engaging face of the cutting insert has an included angle of inward taper of about 64 degrees and the said outwardly tapered faces have an included angle of outward taper of about 60 degrees.

8. The cutting tool of claim 5, wherein the cutting insert engaging face of the wedge has a side angle of taper from about 5 to 20 degrees.

9. The cutting tool of claim 8, wherein the cutting insert engaging face of the wedge has a side angle of taper of from about 7 to 10 degrees.

10. The cutting tool of claim 1, wherein the second engaging means comprises a locator seat having a side face for engaging one of said outwardly tapered side faces of the cutting insert, said cutting insert engaging face of the locator seat having an included angle of taper the same as or no more than one degree different than the included angle of taper of said engaged cutting insert side face.

11. The cutting tool of claim 10, wherein the difference between the angle of taper of the locator seat face and the engaged cutting insert side face is less than about 0.5 degree.

12. The cutting tool of claim 1, wherein one of said upwardly tapered side faces of the cutting insert engages a wall of the recess of the cutting tool, said wall engaging face of the cutting insert having an angle of taper the same as or no more than one degree different than the angle of taper of the wall of the recess.

* * * * *

UNITED STATES PATENT AND TRADEMARK OFFICE
CERTIFICATE OF CORRECTION

PATENT NO. : 4,848,978
DATED : July 18, 1989
INVENTOR(S) : George Keritsis

It is certified that error appears in the above-identified patent and that said Letters Patent is hereby corrected as shown below:

```
Column 5, line 53, "and" should read -- an -- and

"form" should read -- from --.
```

Signed and Sealed this

Twenty-second Day of May, 1990

Attest:

HARRY F. MANBECK, JR.

*Attesting Officer*     *Commissioner of Patents and Trademarks*